United States Patent

[11] 3,604,396

| [72] | Inventor | Kurt Radach |
| | | Kuchen, Wurttenberg, Germany |
| [21] | Appl. No. | 770,753 |
| [22] | Filed | Oct. 25, 1968 |
| [45] | Patented | Sept. 14, 1971 |
| [73] | Assignee | Alfred Heinkel & Co., KG, Metallwarenfabrik Hellmuth-Hirth-Strasse, Germany |

[54] APPARATUS FOR HOUSING ANIMALS
12 Claims, 3 Drawing Figs.

| [52] | U.S. Cl. | 119/22 |
| [51] | Int. Cl. | A01k 31/00 |
| [50] | Field of Search | 119/22 |

[56] References Cited

UNITED STATES PATENTS

| 3,343,522 | 9/1967 | Biehl | 119/22 |

FOREIGN PATENTS

| 867,284 | 5/1961 | Great Britain | 119/22 |

*Primary Examiner*—Hugh R. Chamblee
*Attorney*—Craig, Antonelli, Stewart & Hill

ABSTRACT: Apparatus for collecting and discharging excrements from animal cages, particularly cages for housing animals for experimental purposes, which cages are disposed in side-by-side relationship in one or more rows, including permeable floors in the animal cages, a collecting and discharging trough extending beneath the floors of a row of cages, and a slide member adapted for reciprocating motion within the collecting and discharging trough, said slide member incorporating at least one pusher plate extending in a plane at substantially right angles to the longitudinal extension of the trough, the surface area of which pusher plate corresponds substantially to the cross-sectional area of the trough. The slide member, in accordance with the present invention, may be constructed in the form of a tank for dispensing a disinfectant as the slide member traverses the surface of the collecting and discharging trough.

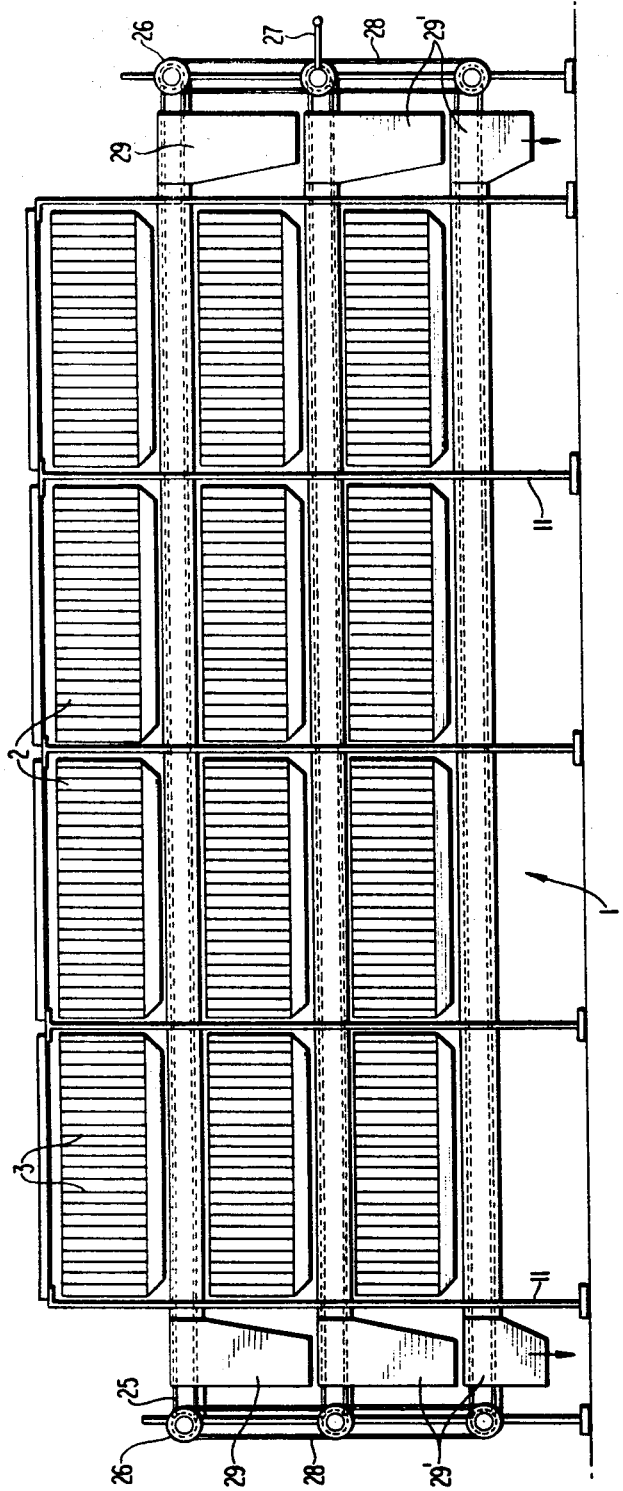
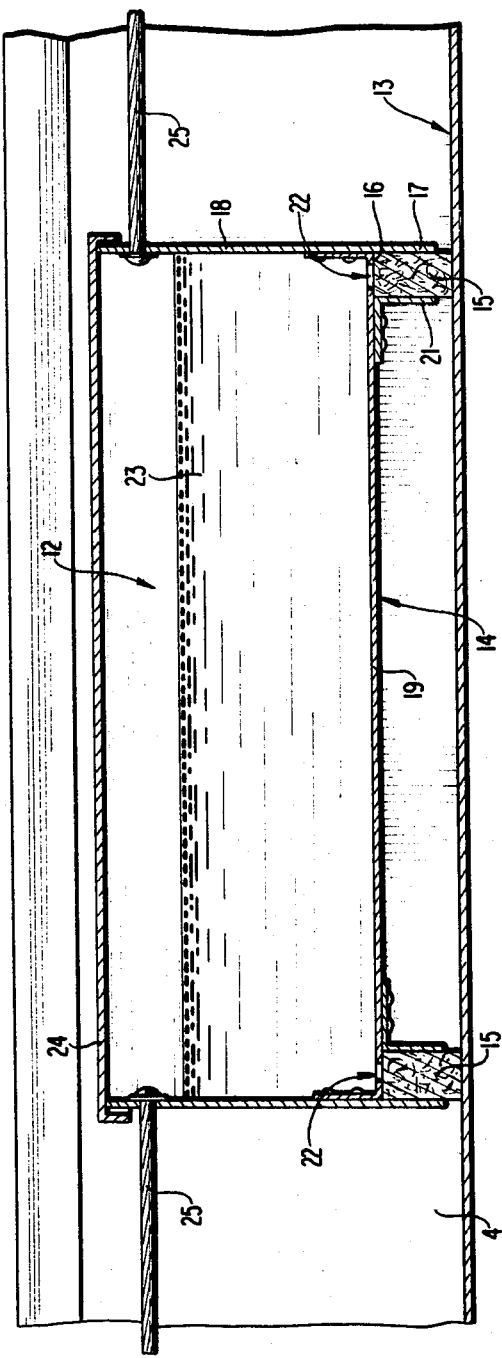

APPARATUS FOR HOUSING ANIMALS

The present invention relates to apparatus for collecting and discharging waste matter from animal cages, particularly a plurality of cages for housing animals for experimental purposes, which cages are disposed in side-by-side relationship in one or more rows and are provided with permeable floor members.

In conventional animal cages of this general type, the collecting and discharging of the animal excrements has been considerably time consuming and expensive, due particularly to the fact that the floors of the individual cages, or collecting tanks which have been disposed beneath the cages, had to be individually removed, cleaned and replaced. In addition to the time required to perform these operations, such handling methods involved further disadvantages, particularly when the animals housed within the cages were infected with diseases which could be transmitted to personnel coming in contact with the waste materials from the cages.

These deficiencies are overcome by the present invention by the provision of a remotely operated slide member movable within a collecting and discharging trough extending beneath a row of cages. By employing such apparatus, a plurality of animal cages can be cleaned in a single operating step which can be simply executed within a relatively short period of time. Further, the collection and removal of the animal excrements can thus be effected from a point relatively remote from the possibly infectious material being removed.

Therefore, it is an object of the present invention to provide apparatus which overcomes the disadvantages inherent in the conventional apparatus for collecting and removing waste materials from animal cages.

Further, it is an object of the present invention to provide apparatus for collecting and discharging animal excrements from a plurality of cages aligned in one or more rows which effects such waste removal with a minimum of effort and time required.

A further object of the present invention resides in the provision of apparatus which, simultaneously with the removal and discharge of the waste material, effects a disinfecting of the apparatus.

Finally, it is an object of the present invention to provide apparatus for the collection and removal of animal excrements which can be operated remotely from the offensive and possibly infectious material being handled, thus enhancing the safety conditions for the personnel involved.

These and other objects are accomplished, in accordance with the present invention, by the provision of collecting and discharge trough members extending beneath a plurality of aligned animal cages, which cages are provided with permeable floor members. Slide members adapted for reciprocal motion in the longitudinal direction of the collecting and discharging troughs and having at least one pusher plate supported thereon are utilized for removing the waste materials within the collecting and discharging trough and depositing these materials in appropriately positioned receptacles. In order to effectively remove all of the waste matter efficiently, the surface of the pusher plate, extending in a plane substantially at right angles to the longitudinal extension of the collecting and discharging trough, conforms to the cross-sectional area of the trough. Further, those surfaces of the pusher plate which extend parallel to the inner surfaces of the trough may be covered, at least over a portion thereof, with felt or similar material, which conformingly occupies the interspace between the external surfaces of the pusher plate and the corresponding inner surfaces of the trough.

The present invention further contemplates the construction of the slide member in the form of a tank for the storage and metered distribution of a disinfecting fluid, the distribution of which fluid is effected by means of holes provided in the bottom of the tank. The holes are preferably located such that they are covered with a lining of felt or similar material, such that the size and positioning of the holes, as well as the capillary action of the felt liner, may be selected to provide a predetermined metering of the disinfecting fluid.

Further details of the present invention will be clearly disclosed from the following description, when considered with reference to one embodiment illustrated in the accompanying drawings, wherein:

FIG. 1 represents a rack of animal cages disposed in a side-by-side relationship, wherein three rows of animal cages are superposed;

FIG. 2 represents a cross-sectional view along line II—II of FIG. 3, through a slide member constructed in the form of a distributing tank.

Figure 3:
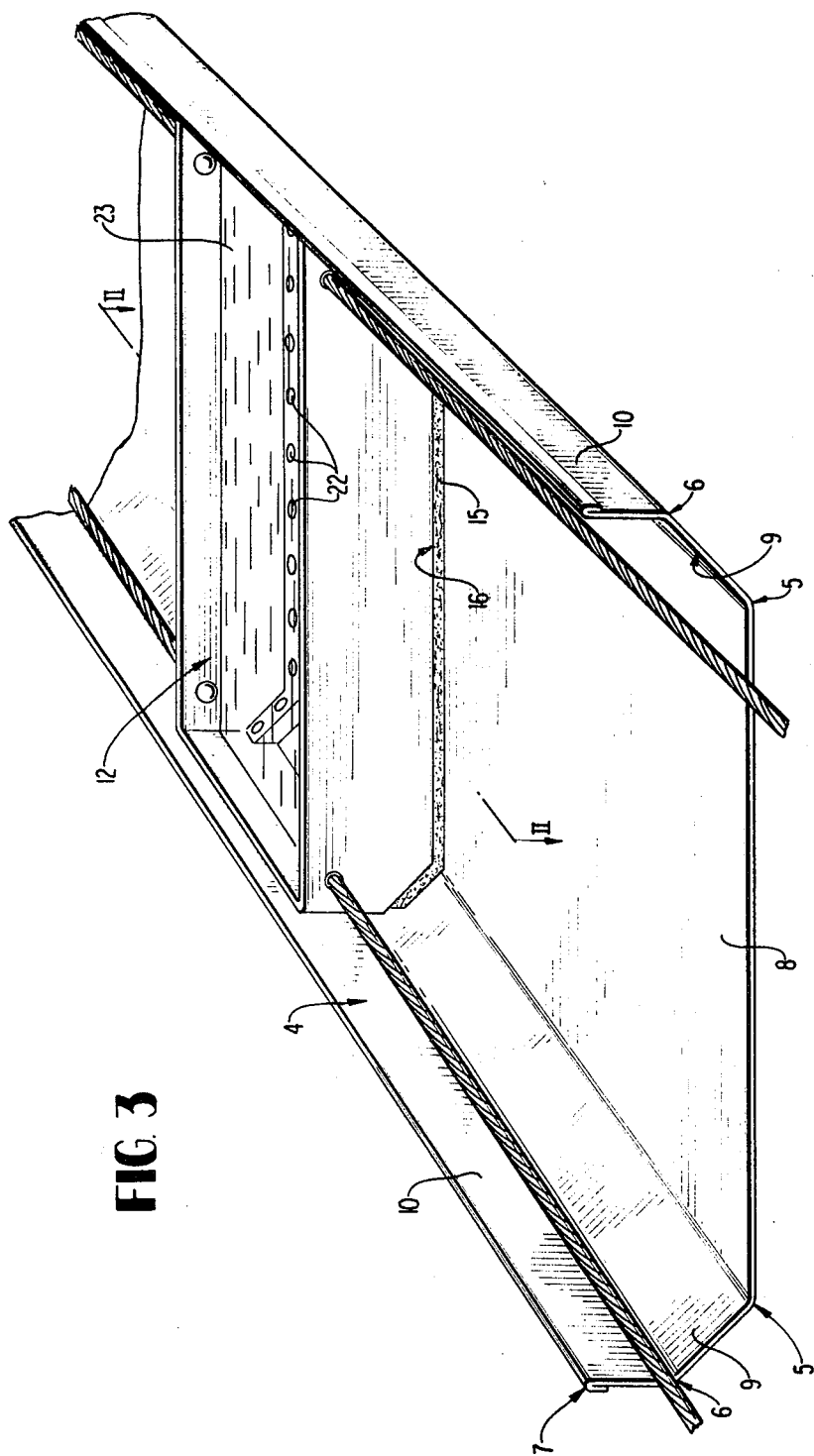
FIG. 3 is a perspective view of a slide member in the form of a tank movably guided within a collecting and discharging trough for the excrements of the animals.

In the arrangement illustrated in FIG. 1, a plurality of animal cages 2 are disposed in a side-by-side relationship within a rack 1, wherein three rows of cages are positioned one above the other. The individual cages 2 are formed of grating or screen members 3 in a conventional manner. Although not shown in the drawing, the bottoms of the individual animal cages are similarly formed of bars, screens, gratings or the like such that the animal excrements can fall, under the influence of gravity, into collecting and discharging troughs 4 extending beneath each row of cages.

The collecting troughs 4 are preferably formed from sheet metal, incorporating bent sections 5, 6 and 7 extending in the longitudinal direction thereof, which bent sections provide structural reinforcement of he troughs 4 between the flat web portions 8, 9 and 10 thereof. Further reinforcement of the troughs 4 is provided by their connection with the vertical posts 11 of the rack 1 and/or with transverse supporting rods connecting the posts 11.

Within the troughs 4, a slide member 12, illustrated in the form of a tank, is guided for reciprocal movement in the longitudinal direction of the trough. When the slide member 12 is constructed in the form of a tank, as shown, the two sides of the tank extending substantially at right angles to the longitudinal extension of the troughs 4 serve as pusher plates for conveying the waste materials deposited on the inner surfaces of the troughs. The outer surface 14 of the tank which extends substantially parallel to the inner surface 13 of the trough is lined with felt strips 15 provided at the two bottom edges 16 of the tank 12, extending at right angles to the trough. These felt strips 15, which occupy the interspace between the surface 14 of the tank and the inner surface 13 of the trough, are clamped between the extension 17 of the transverse wall 18 of the tank and an angle bracket 21, attached to the bottom 19 of the tank, and are secured at that point.

In the bottom of the tank, above the felt strips 15, holes 22 are provided, through which disinfecting fluid 23, deposited within the tank 12, can penetrate into the felt. Preferably, the capillary action of the felt is of such a magnitude that no disinfecting fluid escapes through the felt when the tank 12 is stationary; however, when the tank 12 traverses the inner surface 13 of the trough, the inner surface 13 is wetted by the disinfecting fluid through the felt.

It is, of course, also possible to employ a plurality of felt webs or sheet of felt covering the entire bottom surface of the tank as an alternative to the illustrated arrangement wherein two felt strips 15 are disposed in the proximity of the bottom edges 16 of the tank 12.

It is further contemplated that the tank 12 can be covered by means of lid 24, thus preventing the entry of any of the excrements within the trough into the tank 12 when the tank is set in motion.

The tank 12, with its two sidewall members serving as pusher plates, may be connected with the ends of a draw rope 25, which is guided over rollers 26, which rollers are supported on both sides of the animal cages 2 alongside each row of cages within rack 1. The rollers 26 are controlled by means of a crank 27. The draw rope 25 affixed to the tank can be tensioned by means of a stretching device disposed within the tank 12. When more than one row of animal cages are disposed in superposed relationship, as shown, the rollers 26, correspondingly disposed in superposed relationship, can be operatively connected by means of V-belts 28 extending around rollers 26. Consequently, only a single crank control 27 is required for simultaneously setting in motion the plurality of tank or other slide members. As illustrated, the crank 27 is provided approximately in the center of the three rows; however, the crank 27 could also be attached to the shaft of the upper or lower rollers 26.

The shafts supporting the rollers 26 are provided with rope pulleys for accommodating the draw rope 25 as well as with additional driver rollers for supporting the V-belts 28.

At the terminal portions of the rack 1, collecting guides 29, which may be of funnel shape, are connected with the ends of the troughs 4. These collecting guides cooperate with the troughs 4 to conduct the excrements conveyed by the slide member to an appropriately positioned collecting receptacle or discharge channel (not shown). Additional collecting guides 29' may of course be provided, in superposed relationship, each additional collecting guide being associated with a respective trough 4.

The entire unit assembly of animal cages, including the supporting rack 1, but particularly the troughs 4 and the tank 12, may preferably be constructed of stainless steel.

While I have shown and described only one embodiment in accordance with the present invention, it is to be understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. Apparatus for housing animals, particularly those kept for experimentation, comprising:
    at least one row of animal cages disposed in side-by-side relationship, each of said cages having permeable bottoms,
    collecting and discharging trough means extending beneath each row of cages,
    slide means comprising a distributing tank movable reciprocally in the longitudinal direction of said trough means and having an upper portion with an opening for receiving a fluid to be distributed and a plurality of apertures provided in said distributing tank and extending at substantially right angles to the longitudinal direction of said trough means and spaced apart and including pusher plate means secured at said distributing tank and extending at substantially right angles to the longitudinal extension of said trough means, said pusher plate means having an area only slightly smaller than the cross-sectional area of said trough means and is shaped to conform with an inner surface of said trough means, said slide means further including elements extending in the transverse direction of said trough means and further comprising filler means formed from a fibrous and relatively resilient material secured to a lower portion of said distributing tank, said filler means occupying the interspace between said elements and the corresponding inner surface of said trough means, and
    means for moving said slide within said trough means, wherein
    said plurality of apertures are located on the portion of said tank whose outer surfaces are covered with said filler means.

2. Apparatus according to claim 1, wherein said filler means are positioned in close proximity to the extremities of the transversely extending sides of said distributing tank, said strips extending substantially at right angles to the longitudinal extension of said trough means.

3. Apparatus according to claim 1, further comprising cover means for closing the opening provided in the upper surface of said distributing tank.

4. Apparatus according to claim 3, wherein said means for moving said slide means includes draw rope means secured to said slide means, pulley means positioned beyond each end of each row of cages at a height corresponding substantially to that of the slide means associated with the respective row of cages, and crank means, said draw rope means engaging with said pulley means and said crank means whereby rotation of said crank means effects a translational motion of said slide means within said trough means.

5. Apparatus according to claim 4, wherein more than one row of cages are disposed in superposed relationship, and further comprising flexible belt means operatively interconnecting the correspondingly superposed pulley means for coordinating the rotational motion of said pulley means in response to a rotation of said crank means.

6. Apparatus according to claim 5, further comprising vertical guide means for conveying material carried to the horizontal extremities of said trough means by said slide means, said vertical guide means being connected with said horizontal extremities of at least said trough means associated with the uppermost row of cages and forming a funnel for the passage therethrough, under the influence of gravity, of the material collected in said trough means.

7. Apparatus according to claim 6, wherein said vertical guide means are provided, in vertically aligned relationship, at the extremities of each of said trough means, and further comprising receptacle means positioned below each of the lowermost positioned of said vertical guide means.

8. Apparatus according to claim 7, wherein at least said trough means and said slide means are formed from stainless steel sheet members.

9. Apparatus for housing animals, especially those kept for experimentation, comprising:
    at least one row of animal cages disposed in side-by-side relationship, each of said cages having a permeable bottom:
    collecting and discharging trough means spaced underneath each row of cages;
    manure-removing slide means reciprocally movable in said trough means and shaped to conform with the internal surfaces of said trough means, said slide means further including resilient filler means located between said slide means and the corresponding internal surfaces of said trough means;
    wherein said slide means comprises a tank means for storing and feeding a cleansing fluid for the internal surfaces of the trough means, said filler means comprising felt strips provided on the bottom of said tank means, said tank means being provided with a plurality of apertures on the bottom thereof and said apertures being covered by said felt strips.

10. Apparatus according to claim 9, wherein said apertures are positioned adjacent to the edges of the transversely extending sides of said tank means and at substantially right angles to the longitudinal extension of said trough means.

11. Apparatus according to claim 10, wherein means is provided for covering an opening in the upper surface of said tank means.

12. Apparatus according to claim 9, wherein said trough means includes a substantially planar bottom surface, inclined portions extending in the longitudinal direction of said trough means at the side of said bottom surface, and substantially vertically disposed strips being located on the other ends of the inclined portions, wherein the free ends of said strips are provided with flange means.